July 25, 1939.    A. VERLAY    2,167,318
METHOD AND MEANS FOR SHAPING GLASS
Filed Nov. 23, 1934
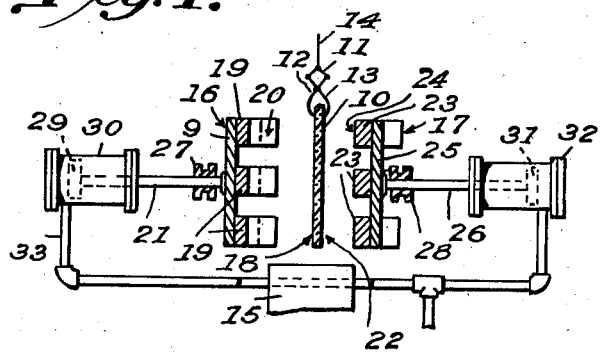
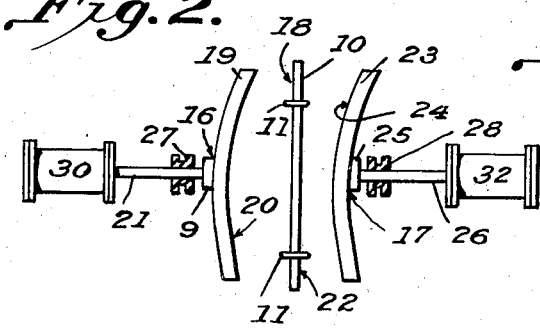
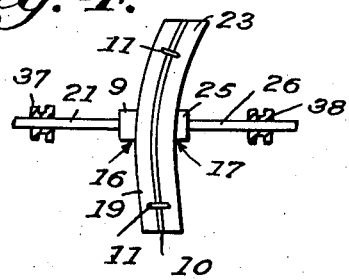
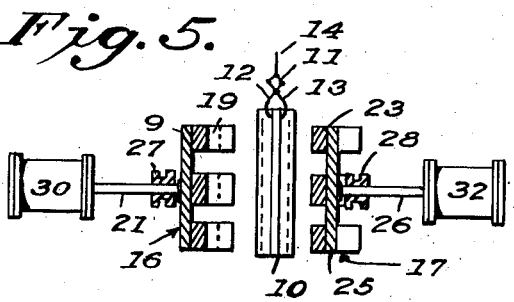
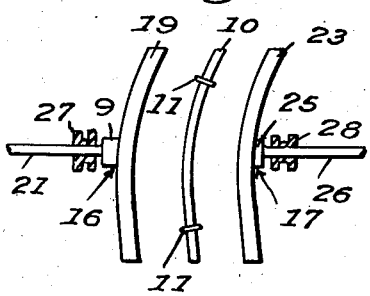
Inventor
ACHILLE VERLAY
By  Dusey & Cole
Attorney Patented July 25, 1939

2,167,318

UNITED STATES PATENT OFFICE 2,167,318

METHOD AND MEANS FOR SHAPING GLASS

Achille Verlay, Longueil-Annel, France, assignor to Societe Anonyme des Manufactures des Glaces & Produits Chimiques de Saint-Gobain, Chauny & Cirey, Paris, France Application November 23, 1934, Serial No. 754,525
In France November 25, 1933

9 Claims. (Cl. 49—7)

This invention relates to a method and means for shaping sheet glass and refers more particularly to a method and a device for bending thin sheets of glass to provide glass surfaces having a predetermined curvature.

An object of this invention is the provision of a method by means of which curved glass surfaces may be manufactured in a comparatively short time.

Another object is the provision of a device for bending a sheet of glass in such manner that the resulting article has two surfaces which can be made exactly parallel to each other.

A further object is the manufacture of curved glass sheets having smooth and rounded curved surfaces.

The above and other objects of this invention may be realized by placing a sheet of glass in a vertical position, for instance by suspending the same vertically and heating the same to a temperature which is close to the softening temperature of this glass. Then both faces of the sheet of glass, while placed in a vertical position, are subjected to pressure through the application of suitable shaped pressure elements or forming dies until the desired curvature is attained. Then the forming dies are removed and the sheet of glass is submitted to any convenient treatment.

By maintaining the sheet vertically or in suspension during the heating and forming operations and after the completion of the latter, the sheet is prevented from sagging and contacting unduly with surfaces such as would be the case if the sheet were heat-treated and formed while in a horizontal position.

In supporting the sheet vertically, and especially by the suspending means herein disclosed the sheet is free to move under the action of the forming or shaping means, thus minimizing any tendency of the sheet to distort such as would occur if the sheet were held in a fixed or immovable support.

The treatment of the sheet while in a vertical or suspended position also permits the use of spaced shaping or forming elements and may render unnecessary the use of solid or continuous shaping surfaces since the glass does not have any tendency to flow or sag into the spaces or recesses between the spaced shaping elements.

In some cases it has been found of interest to condition or anneal the sheet of glass while placed vertically after shaping in order to keep the shape given to the sheet.

It has also been found of value to avoid contact of the sheet with any solid elements or members with the exception of those used for maintaining or suspending the sheet of glass in a vertical position, during the heating and eventually the conditioning operation.

The above and other objects of this invention will appear more clearly from the following detailed description when taken in connection with the accompanying drawing showing preferred embodiments of the inventive idea.

In the drawing:

Figure 1 shows in vertical section a suspended flat sheet of glass and a device for shaping the same.

Figure 2 is a top view of the device shown in Figure 1.

Figure 3 illustrates in vertical section a shaping device of a somewhat different construction, said device being shown during the bending of the flat sheet of glass.

Figure 4 is a top view of the device shown in Figure 3.

Figure 5 shows in vertical section the device illustrated in Figures 1 and 2 after the shaping process has been completed.

Figure 6 is a top view of the device shown in Figure 5.

A flat sheet of glass 10 which may be manufactured in accordance with any well known methods and which as shown in Figures 1 and 2 of the drawing is suspended vertically by a pair of clamps 11, each of which comprises a pair of jaws 12 and 13 applied to the opposite surfaces of the sheet of glass 10 adjacent to the upper edge thereof. The clamps 11 are attached by wires or strings 14 to any suitable support not shown in the drawing.

The flat sheet of glass 10 suspended vertically by means of clamps 11 is first heated in a furnace 15 indicated diagrammatically in Figure 1, unt'l the temperature of the glass sheet 10 is close to the softening temperature of the glass. Then the sheet of glass 10 is removed from the furnace 15 and is rapidly brought in contact with a pair of pressure elements or forming dies 16 and 17. The forming die 16 which is applied to the surface 18 of the sheet of glass 10 comprises rib-like members 19 made of wood, asbestos or any other suitable rigid or elastic material and having outer surfaces 20 which have the required curvature.

As previously explained, inasmuch as the sheet is maintained vertically or in suspension, a solid or continuous surface is not always required for the forming members since the glass will not tend to flow or sag into the spaces or recesses between the rib-like members 19.

The ribs 19 are carried by a plate 9 which is rigidly connected with a rod 21.

The forming die 17 which is applied against the surface 22 of the glass sheet 10, comprises a number of rib-like members 23 which are parallel to the elements 19 and are preferably made of the same material. The ribs 23 are provided with outer surfaces 24 having the required curvature, and are carried by a plate 25 which is firmly attached to one end of a rod 26.

Experience has shown that it is not necessary that the members press upon the whole surface of the sheet but only on a part of it. Accordingly the members 19 or respectively 23 do not need to be located adjacent one to the other on the respective plates 9 and 25.

As soon as the flat sheet of glass 10 is removed from the furnace 15 the rib-like members 19 and 23 are pressed against the surfaces 18 and 22, respectively, of the sheet of glass 10. It is advisable that the same amount of pressure be applied against both surfaces of the glass sheet 10.

In the device illustrated in Figures 1, 2, 5 and 6, the rods 21 and 26 are supported by bearings 27 and 28, respectively. A piston 29 is situated within a cylinder 30 and is rigidly connected with the piston rod 21 (Fig. 1). In a similar manner, the piston rod 26 is connected with a piston 31 situated within a cylinder 32. A conduit 33 is used for supplying a pressure fluid into the interior of the cylinders 30 and 31 for the purpose of pressing the forming dies 16 and 17 against the sheet of glass 10.

In the modification shown in Figures 3 and 4 of the drawing, the forming dies 16 and 17 are pressed against opposite surfaces of a sheet of glass 10 by manual or mechanical forces exerted upon a pair of jaws 34 connected with the opposite ends of the rods 21 and 26 which are supported by bearings 37 and 38.

Obviously, a variety of different devices may be used for the purpose of causing the forming dies 16 and 17 to exert a pressure upon the suspended sheet of glass 10.

The forming dies 6 and 17 are drawn away from the suspended sheet of glass 10 as soon as it has acquired the desired form, as shown in Figures 5 and 6.

Then the shaped sheet of glass 10 may be submitted to any suitable treatment, or conditioning.

It is possible to use the same forming dies 16 and 17 for the purpose of manufacturing a pair of curved glass sheets which are symmetrical with respect to each other. After one sheet of glass has been made it is merely necessary to turn the forming dies 16 and 17 to an angle of 180 degrees with respect to their original positions. In the device illustrated in Figures 1, 2, 5 and 6, this can be easily accomplished by turning the rods 21 and 26. Then the same pressure ribs 19 and 23 may be used for shaping the second glass sheet which will be symmetrical to the originally manufactured sheet of glass.

Following the bending or shaping operation, the sheet may be suitably conditioned, that is to say, as for example, annealed.

It has been found of interest that during the heating of the sheet of glass and even during its conditioning the latter does not come in contact with any solid body with the exception of the comparatively small area of contact between the sheet of glass and the supporting device, for instance the clamps 11 shown in the drawing. Due to this arrangement the sheet of glass may be heated and conditioned extremely regularly and uniformly on both surfaces.

Furthermore, since pressure is applied at the same time against both surfaces of a sheet of glass the glass is bent gradually and uniformly and the shaping requires a minimum amount of time.

It has been found by actual experiments that the shaping process takes place so rapidly that it is not necessary to insulate the forming dies 16 and 17 against the high temperature of the heated sheet of glass, although this may be done.

The sheets of glass manufactured in accordance with the described method keep their initial smoothness so that it is not necessary to submit them to repolishing treatment.

The same method may be applied for straightening bent glass sheets, instead of bending flat sheets.

What is claimed is:

1. The method of bending a glass sheet which comprises suspending it in a vertical position from a plurality of spaced supports engaging the same near the upper edge thereof, each of the said supports being free to move with the sheet during the bending, heating the sheet until the glass is at the softening point and applying pressure to the sheet to bend the same so that the surface thereof has the desired curvature in respect to a horizontal plane.

2. The method of bending a glass sheet which comprises suspending it in a vertical position from a plurality of spaced supports engaging the same near the upper edge thereof, each of the said supports being free to move laterally with the sheet during the bending, heating the sheet until the glass is at the softening point and applying pressure to the sheet to bend the same so that the surface thereof has the desired curvature in respect to a horizontal plane.

3. The method of bending a glass sheet which comprises suspending it in a vertical position from a plurality of spaced supports engaging the same near the upper edge thereof, each of the said supports being free to turn on a vertical axis with the sheet during the bending, heating the sheet until the glass is at the softening point and applying pressure to the sheet to bend the same so that the surface thereof has the desired curvature in respect to a horizontal plane.

4. The method of bending a glass sheet which comprises suspending it in a vertical position from a plurality of spaced supports engaging the same near the upper edge thereof, each of the said supports being free to move laterally with the sheet and to turn on a vertical axis with the sheet during the bending, heating the sheet until the glass is at the softening point and applying pressure to the sheet to bend the same so that the surface thereof has the desired curvature in respect to a horizontal plane.

5. In an apparatus for bending glass sheets, the combination of a plurality of supporting means to engage the sheet near its upper edge at points separated from each other, each of said means being free to move with the sheet during the bending, means for heating the sheet until the glass is at the softening point, and means for bending the sheet to a desired curvature in respect to a horizontal plane.

6. In an apparatus for bending glass sheets, the combination of a plurality of supporting means to engage the sheet near its upper edge at points separated from each other, each of said means being free to move laterally with the sheet during the bending, means for heating the sheet until the glass is at the softening point, and means for bending the sheets to a desired curvature in respect to a horizontal plane.

7. In an apparatus for bending glass sheets, the combination of a plurality of supporting means to engage the sheet near its upper edge at points separated from each other, each of said means being free to turn on a vertical axis with the sheet during the bending, means for heating the sheet until the glass is at the softening point, and means for bending the sheets to a desired curvature in respect to a horizontal plane.

8. In an apparatus for bending glass sheets, the combination of a plurality of supporting means to engage the sheet near its upper edge at points separated from each other, each of said means being free to move laterally with the sheet and to turn on a vertical axis with the sheet during the bending, means for heating the sheet until the glass is at the softening point, and means for bending the sheets to a desired curvature in respect to a horizontal plane.

9. The method of bending a glass sheet which comprises supporting it in a vertical position by means free to move with the sheet during the bending; heating the sheet until the glass is at the softening point and applying pressure to the sheet to bend the same so that the surface thereof has the desired curvature in respect to a horizontal plane.

ACHILLE VERLAY.